United States Patent
Takahashi et al.

(10) Patent No.: US 8,268,289 B2
(45) Date of Patent: Sep. 18, 2012

(54) HYDROCARBON-DECOMPOSING CATALYST, PROCESS FOR DECOMPOSING HYDROCARBONS AND PROCESS FOR PRODUCING HYDROGEN USING THE CATALYST, AND POWER GENERATION SYSTEM

(75) Inventors: Shinji Takahashi, Hiroshima-ken (JP); Naoya Kobayashi, Hiroshima-ken (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 0 days.

(21) Appl. No.: 12/668,714

(22) PCT Filed: Jul. 18, 2008

(86) PCT No.: PCT/JP2008/001931
§ 371 (c)(1), (2), (4) Date: May 7, 2010

(87) PCT Pub. No.: WO2009/011133
PCT Pub. Date: Jan. 22, 2009

(65) Prior Publication Data
US 2010/0254892 A1    Oct. 7, 2010

(30) Foreign Application Priority Data
Jul. 19, 2007 (JP) .................................. 2007-188839

(51) Int. Cl.
- C01B 3/26 (2006.01)
- B01J 23/00 (2006.01)
- B01J 21/00 (2006.01)

(52) U.S. Cl. ............... 423/651; 502/60; 502/63; 502/73; 502/74; 502/80; 502/84; 502/87; 502/326; 502/327; 502/328; 502/332; 502/333; 502/335; 502/337; 502/339; 502/340; 502/341; 502/355; 502/415; 502/439

(58) Field of Classification Search .................. 502/60, 502/63, 73, 74, 326–328, 332, 333, 335, 502/337, 339, 340, 341, 355, 415, 439, 80, 502/84, 87; 423/651
See application file for complete search history.

(56) References Cited

U.S. PATENT DOCUMENTS

| | | | |
|---|---|---|---|
| 3,554,929 A * | 1/1971 | Aarons | 502/178 |
| 3,751,508 A * | 8/1973 | Fujiso et al. | 585/262 |
| 4,049,582 A * | 9/1977 | Erickson et al. | 502/306 |
| 4,157,315 A * | 6/1979 | Michels et al. | 502/245 |
| 4,469,816 A * | 9/1984 | Armor et al. | 502/333 |
| 4,728,635 A * | 3/1988 | Bhattacharyya et al. | 502/304 |
| 4,892,857 A * | 1/1990 | Tennent et al. | 502/439 |
| 5,494,560 A * | 2/1996 | Arimoto et al. | 204/290.08 |
| 5,512,379 A * | 4/1996 | Kawasumi et al. | 428/548 |
| 5,618,772 A * | 4/1997 | Suda et al. | 502/238 |
| 5,958,829 A * | 9/1999 | Domesle et al. | 502/333 |
| 6,174,835 B1 * | 1/2001 | Naito et al. | 502/325 |
| 6,221,805 B1 * | 4/2001 | Yamashita et al. | 502/332 |
| 6,863,708 B2 * | 3/2005 | Kagohashi et al. | 75/364 |
| 6,903,046 B2 * | 6/2005 | Ding | 502/185 |
| 7,037,873 B2 * | 5/2006 | Kato | 502/180 |
| 7,196,036 B2 * | 3/2007 | Kobayashi et al. | 502/335 |
| 7,211,541 B2 * | 5/2007 | Fetcenko et al. | 502/328 |
| 7,351,382 B2 * | 4/2008 | Pfeifer et al. | 422/177 |
| 7,399,728 B2 * | 7/2008 | LaBarge | 502/325 |
| 7,452,842 B2 * | 11/2008 | Wakatsuki et al. | 502/326 |
| 7,452,844 B2 * | 11/2008 | Hu et al. | 502/327 |
| 7,491,674 B2 * | 2/2009 | Fujii et al. | 502/340 |
| 7,510,993 B2 * | 3/2009 | Levey et al. | 502/150 |
| 7,569,508 B2 * | 8/2009 | Zhou et al. | 502/150 |
| 7,582,202 B2 * | 9/2009 | Jones et al. | 208/111.35 |
| 7,585,811 B2 * | 9/2009 | Nakamura et al. | 502/327 |
| 7,601,670 B2 * | 10/2009 | Yasuda et al. | 502/326 |
| 7,635,461 B2 * | 12/2009 | Anderson | 423/579 |
| 7,674,744 B2 * | 3/2010 | Shiratori et al. | 502/327 |
| 7,713,908 B2 * | 5/2010 | Yamamoto et al. | 502/300 |
| 7,713,911 B2 * | 5/2010 | Wakamatsu et al. | 502/332 |
| 7,759,281 B2 * | 7/2010 | Kezuka et al. | 502/309 |
| 7,803,734 B2 * | 9/2010 | Majima et al. | 502/185 |
| 7,879,749 B2 * | 2/2011 | Rollins et al. | 502/62 |
| 2005/0159306 A1 * | 7/2005 | Kezuka et al. | 502/350 |
| 2007/0036713 A1 * | 2/2007 | Kobayashi et al. | 423/652 |

(Continued)

FOREIGN PATENT DOCUMENTS

JP    2004-209408    7/2004

(Continued)

OTHER PUBLICATIONS

International Search Report for PCT/JP2008/001931, mailed Aug. 19, 2008.

(Continued)

Primary Examiner — Cam N. Nguyen
(74) Attorney, Agent, or Firm — Nixon & Vanderhye P.C.

(57) ABSTRACT

The present invention relates to a catalyst for decomposing hydrocarbons including hydrocarbons having 2 or more carbon atoms, comprising magnesium, aluminum, nickel and cobalt as constitutional elements, and further comprising ruthenium and/or palladium, wherein the metallic ruthenium and/or metallic palladium in the form of fine particles have an average particle diameter of 0.5 to 20 nm, and a content of the metallic ruthenium and/or metallic palladium is 0.05 to 5.0% by weight based on the weight of the catalyst. The catalyst of the present invention is capable of efficiently decomposing hydrocarbons including hydrocarbons having 2 or more carbon atoms ($C_2$ or more hydrocarbons), is less expensive, and exhibits an excellent catalytic activity for decomposition and removal of hydrocarbons, in particular, an excellent capability of decomposing propane, and an excellent anti-coking property.

5 Claims, No Drawings

U.S. PATENT DOCUMENTS

2008/0146846 A1 6/2008 Dialer et al.
2011/0038775 A1* 2/2011 Takahashi et al. ......... 423/245.1

FOREIGN PATENT DOCUMENTS

| JP | 2005-254044 | 9/2005 |
|---|---|---|
| JP | 2005-296938 | 10/2005 |
| JP | 2006-061760 | 3/2006 |
| JP | 2007-313496 | 12/2007 |
| JP | 2007-326756 | 12/2007 |
| WO | WO 2006/069673 A1 | 7/2006 |
| WO | WO 2009/115322 A2 | 9/2009 |

OTHER PUBLICATIONS

Extended European Search Report in EP 08 79 0233 mailed Mar. 29, 2011.

* cited by examiner

HYDROCARBON-DECOMPOSING CATALYST, PROCESS FOR DECOMPOSING HYDROCARBONS AND PROCESS FOR PRODUCING HYDROGEN USING THE CATALYST, AND POWER GENERATION SYSTEM

This application is the U.S. national phase of International Application No. PCT/JP2008/001931, filed 18 Jul. 2008, which designated the U.S. and claims priority to Japanese Patent Application No. 2007-188839, filed 19 Jul. 2007 the entire contents of each of which are hereby incorporated by reference.

TECHNICAL FIELD

The present invention relates to a catalyst which is capable of efficiently decomposing hydrocarbons comprising hydrocarbons having 2 or more carbon atoms ($C_2$ or more hydrocarbons), is less expensive, and exhibits an excellent catalytic activity for decomposition and removal of hydrocarbons, in particular, an excellent capability of decomposing propane, and an excellent anti-coking property.

In addition, the present invention aims at not only efficiently decomposing and removing $C_2$ or more hydrocarbons, in particular, propane, but also producing hydrogen by using the above catalyst.

BACKGROUND ART

In recent years, in the consideration of global environmental problems, early utilization techniques for new energies have been intensively studied, and fuel cells have been noticed as one of these techniques. In the fuel cells, hydrogen and oxygen are electrochemically reacted with each other to convert a chemical energy into an electric energy. Thus, the fuel cells are characterized by a high energy utilization efficiency and, therefore, have been positively studied for practical applications to civil life, industries or automobiles. The fuel cells are generally classified into a phosphoric acid type (PAFC), a molten carbonate type (MCFC), a solid oxide type (SOFC), a solid polymer type (PEFC), etc., according to kinds of electrolytes used therein.

As the method of obtaining a reformed gas comprising hydrogen as a main component by reforming hydrocarbon-containing fuels such as city gas 13A, LPG, kerosene, gasoline and naphtha, there are known various reforming techniques such as SR (steam reforming) method, PDX (partial oxidation) method and SR+PDX (autothermal) method. Among these reforming techniques, application of the SR method to cogeneration has been most noticed, since the SR method enables production of a reformed gas having a high hydrogen concentration.

The steam reforming (SR) is conducted according to the following reaction formula:

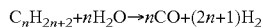

$C_nH_{2n+2} + nH_2O \rightarrow nCO + (2n+1)H_2$

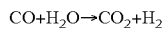

$CO + H_2O \rightarrow CO_2 + H_2$

In general, the above reaction is conducted at a temperature of 600 to 800° C. and a S/C ratio (steam/carbon ratio) of about 2.0 to about 3.5. In addition, the reaction is an endothermic reaction and, therefore, can be accelerated as the reaction temperature is increased.

In general, in the fuel cell system, there may be used the process in which after a substantially whole amount of sulfur components contained in a fuel is removed therefrom using a desulfurizer, the thus desulfurized hydrocarbon is decomposed to obtain a reformed gas comprising hydrogen as a main component, and the resulting reformed gas is introduced into a fuel cell stack. In such a conventional process, a reforming catalyst is used to reform the hydrocarbons. However, the reforming catalyst tends to undergo deterioration in catalyst performance during the operation for a long period of time. In particular, the reforming catalyst tends to be poisoned with a trace amount of sulfur components slipped through the desulfurizer, resulting in problems such as significant deterioration in catalytic activity thereof. In addition, when C2 or more hydrocarbons are used as a fuel, the hydrocarbons in the fuel tend to suffer from thermal decomposition, resulting in deposition of carbon on the catalyst, production of polycondensates and deterioration in performance of the reforming catalyst. Also, among these fuel cell systems, the reforming catalysts for PAFC and PEFC are generally used in the form of a molded product such as beads. In this case, if the beads-shaped catalysts suffer from significant coking inside thereof, the catalysts tend to be broken and powdered, resulting in clogging of a reaction tube therewith.

The fuels such as city gas, LPG, kerosene, gasoline and naphtha comprise not only $C_1$ but also $C_2$ or more hydrocarbons. For example, the city gas 13A comprises about 88.5% of methane, about 4.6% of ethane, about 5.4% of propane and about 1.5% of butane, i.e., comprises, in addition to methane as a main component thereof, hydrocarbons having 2 to 4 carbon atoms in an amount as large as 11.5%. Also, LPG comprises about 0.7% of ethane, about 97.3% of propane, about 0.2% of propylene and about 1.8% of butane, i.e., comprises the $C_4$ hydrocarbon in an amount of 1.8%. These C2 or more hydrocarbons tend to be readily thermally decomposed to cause deposition of carbon.

At present, as an active metal species of the steam reforming catalysts, there may be used base metals such as Ni, Co and Fe, and noble metals such as Pt, Rh, Ru, Ir and Pd. Among these metals, in the consideration of high catalytic activity, there have been mainly used catalysts supporting a metal element such as Ni and Ru.

However, since Ni as a base metal element tends to relatively readily undergo deposition of carbon, it is required that the Ni-containing catalyst is used under a high steam/carbon ratio condition in which steam is added in an excessive amount as compared to a theoretical compositional ratio thereof, so that the operation procedure tends to become complicated, and the unit requirement of steam tends to be increased, resulting in uneconomical process. Further, since the conditions for continuous operation of the system are narrowed, in order to complete the continuous operation of the system using the Ni-containing catalyst, not only an expensive control system but also a very complicated system as a whole are required. As a result, the production costs and maintenance costs tend to be increased, resulting in uneconomical process.

On the other hand, the noble metals such as Ru tend to hardly undergo deposition of carbon even under a low steam/carbon ratio condition. However, the noble metals tend to be readily poisoned with sulfur components contained in the raw materials, and deteriorated in catalytic activity for a short period of time. Further, deposition of carbon tends to be extremely readily caused on the sulfur-poisoned catalysts. Thus, even in the case where the noble metals are used, there also tends to arise such a problem that deposition of carbon is induced by the poisoning with sulfur. In addition, since the noble metals are expensive, the fuel cell systems using the noble metals tend to become very expensive, thereby preventing further spread of such fuel cell systems.

For the above-mentioned reasons, it has been demanded to provide a hydrocarbon-decomposing catalyst which is less expensive and can exhibit as its function an excellent catalytic activity capable of decomposing and removing hydrocarbons, a good anti-coking property even under a low steam condition and an excellent durability.

Conventionally, there have been reported hydrocarbon-decomposing catalysts formed by supporting a catalytically active metal such as platinum, palladium, rhodium, ruthenium and nickel on a carrier comprising α-alumina, magnesium oxide or titanium oxide (Patent Documents 1 to 4).

Patent Document 1: Japanese Patent Publication (KOKOKU) No. 50-4001
Patent Document 2: Japanese Patent Application Laid-Open (KOKAI) No. 2000-503624
Patent Document 3 Japanese Patent Application Laid-Open (KOKAI) No. 2003-225566
Patent Document 4: Japanese Patent Application Laid-Open (KOKAI) No. 2001-146406

DISCLOSURE OF THE INVENTION

Problem to be Solved by the Invention

In the Patent Documents 1 to 3, there are described the catalysts comprising magnesium, aluminum and nickel. However, these catalysts comprise nickel in a very large amount.

In the technique of the Patent Document 4, there is described the process for producing hydrogen by subjecting fuels comprising $C_2$ or more hydrocarbons such as kerosene to steam reforming using a catalyst comprising Ru as an active metal species which is supported on α-alumina as a carrier. However, it is considered that the Ru-based catalyst tends to suffer from sulfidization with sulfur components contained in the raw materials which results in promoted coking and deactivation of the catalyst.

In consequence, an object of the present invention is to provide a catalyst for decomposing hydrocarbons including $C_2$ or more hydrocarbons, in particular, hydrocarbons comprising propane, which is less expensive, has an excellent activity for decomposition and removal of hydrocarbons, in particular, $C_2$ or more hydrocarbons such as propane and exhibits an excellent hydrocarbon decomposing capability even under low steam and low temperature conditions.

In addition, another object of the present invention is to provide a catalyst which has an excellent anti-coking property when used in a hydrocarbon decomposition reaction in which the hydrocarbon to be decomposed is mixed and reacted with steam.

Means for Solving the Problem

The above-described technical problems can be solved by the following aspects of the present invention.

That is, according to the present invention, there is provided a catalyst for decomposing hydrocarbons including hydrocarbons having 2 or more carbon atoms, comprising magnesium, aluminum, nickel and cobalt as constitutional elements, and further comprising ruthenium and/or palladium,
the metallic ruthenium and/or metallic palladium in the form of fine particles having an average particle diameter of 0.5 to 20 nm, and
a content of the metallic ruthenium and/or metallic palladium being 0.05 to 5.0% by weight based on the weight of the catalyst (Invention 1).

Also, according to the present invention, there is provided the catalyst for decomposing hydrocarbons including hydrocarbons having 2 or more carbon atoms as described in the Invention 1, wherein the metallic nickel in the form of fine particles have an average particle diameter of 1 to 20 nm, and a content of the metallic nickel is 0.1 to 20% by weight based on the weight of the hydrocarbon-decomposing catalyst (Invention 2).

Further, according to the present invention, there is provided the catalyst for decomposing hydrocarbons including hydrocarbons having 2 or more carbon atoms as described in the present invention, wherein the metallic cobalt in the form of fine particles have an average particle diameter of 1 to 20 nm, and a content of the metallic cobalt is 0.01 to 20% by weight based on the weight of the hydrocarbon-decomposing catalyst (Invention 3).

Further, according to the present invention, there is provided the catalyst for decomposing hydrocarbons including hydrocarbons having 2 or more carbon atoms as described in any one of the Inventions 1 to 3, further comprising a clay mineral in an amount of 1 to 50% by weight based on the weight of the catalyst (Invention 4).

Further, according to the present invention, there is provided the catalyst for decomposing hydrocarbons including hydrocarbons having 2 or more carbon atoms as described in the Invention 4, wherein at least one element selected from the group consisting of ruthenium, rhodium, iridium, platinum, gold, silver, palladium, nickel, cobalt, copper, iron, zinc, vanadium and manganese, which has an average particle diameter of not more than 50 nm, is supported on the clay mineral (Invention 5).

Further, according to the present invention, there is provided a process for producing a mixed reformed gas comprising hydrogen from hydrocarbons, comprising the step of reacting the hydrocarbons including hydrocarbons having 2 or more carbon atoms with steam at a temperature of 250 to 850° C., at a molar ratio of steam to carbon (S/C) of 1.0 to 6.0 and at a space velocity (GHSV) of 100 to 100000 $h^{-1}$ in the presence of the hydrocarbon-decomposing catalyst as defined in any one of the Inventions 1 to 5 (Invention 6).

In addition, according to the present invention, there is provided a fuel cell system using the catalyst as defined in any one of the Inventions 1 to 5 (Invention 7).

EFFECT OF THE INVENTION

The hydrocarbon-decomposing catalyst of the present invention supports metallic nickel and metallic cobalt in the form of fine particles. For this reason, the metallic nickel and metallic cobalt as an active metal species are increased in contact area with hydrocarbons and steam, and, therefore, can exhibit excellent catalyst properties against hydrocarbons including hydrocarbons having 2 or more carbon atoms ($C_2$ or more hydrocarbons) such as propane.

The hydrocarbon-decomposing catalyst of the present invention undergoes less deposition of carbon thereon even upon the reaction of hydrocarbons including hydrocarbons having 2 or more carbon atoms ($C_2$ or more hydrocarbons) such as propane and, therefore, can exhibit an excellent anti-coking property.

Also, the hydrocarbon-decomposing catalyst of the present invention exhibits an excellent resistance to sulfur components contained in the raw material gases and, therefore, can maintain an excellent catalytic activity for a long period of time.

In addition, the hydrocarbon-decomposing catalyst of the present invention is capable of safely and efficiently suppressing formation of metal carbonyl. Further, according to the present invention, there are also provided the methods for reforming hydrocarbons and removing metal carbonyl "in-situ" using the catalyst, as well as the method of using the catalyst in a fuel cell system.

PREFERRED EMBODIMENT FOR CARRYING OUT THE INVENTION

First, the catalyst for decomposing hydrocarbons including hydrocarbons having 2 or more carbon atoms according to the present invention is described.

In the hydrocarbon-decomposing catalyst of the present invention, metallic nickel and metallic cobalt in the form of fine particles as well as metallic ruthenium and/or metallic palladium in the form of fine particles are present in a composite oxide comprising magnesium and aluminum.

In the catalyst of the present invention which comprises magnesium, aluminum, nickel and cobalt as constitutional elements and further comprises ruthenium and/or palladium, the metallic ruthenium and/or metallic palladium in the form of fine particles have an average particle diameter of not more than 20 nm, so that the catalyst exhibits an optimum and excellent catalytic activity for production of hydrogen. When the average particle diameter of the metallic ruthenium fine particles and/or metallic palladium fine particles is more than 20 nm, the resulting catalyst tends to be deteriorated in catalytic activity when used in a steam-reforming method for production of hydrogen in which hydrocarbons to be treated are mixed with steam. The average particle diameter of the metallic ruthenium fine particles and/or metallic palladium fine particles is preferably not more than 15 nm and more preferably not more than 10 nm. The lower limit of the average particle diameter of the metallic ruthenium fine particles and/or metallic palladium fine particles is about 0.5 nm.

In the catalyst of the present invention which comprises magnesium, aluminum, nickel and cobalt as constitutional elements and further comprises ruthenium and/or palladium, the content of the metallic ruthenium and/or metallic palladium is 0.05 to 5.0% by weight based on the weight of the catalyst. When the content of the metallic ruthenium and/or metallic palladium is less than 0.05% by weight, the resulting catalyst tends to be lowered in conversion rate of hydrocarbons. On the other hand, when content of the metallic ruthenium and/or metallic palladium is more than 5.0% by weight, the resulting catalyst tends to be too expensive and, therefore, unpractical. The content of the metallic ruthenium and/or metallic palladium in the catalyst is preferably 0.05 to 4.5% by weight.

In the catalyst of the present invention which comprises magnesium, aluminum, nickel and cobalt as constitutional elements and further comprises ruthenium and/or palladium, the metallic nickel in the form of fine particles has an average particle diameter of not more than 20 nm, so that the catalyst exhibits an excellent catalytic activity for production of hydrogen. When the average particle diameter of the metallic nickel fine particles is more than 20 nm, the resulting catalyst tends to be lowered in conversion rate of hydrocarbons when used in a steam-reforming method for production of hydrogen in which hydrocarbons to be treated are mixed with steam. Further, the catalyst comprising the metallic nickel fine particles having an average particle diameter of more than 20 nm tends to be considerably deteriorated in anti-coking property. The average particle diameter of the metallic nickel fine particles is preferably not more than 10 nm and more preferably not more than 8 nm. The lower limit of the average particle diameter of the metallic nickel fine particles is about 0.5 μm.

In the catalyst of the present invention which comprises magnesium, aluminum, nickel and cobalt as constitutional elements and further comprises ruthenium and/or palladium, the metallic cobalt in the form of fine particles has an average particle diameter of not more than 20 nm, so that the catalyst exhibits an excellent catalytic activity for production of hydrogen. When the average particle diameter of the metallic cobalt fine particles is more than 20 nm, the resulting catalyst tends to be lowered in conversion rate of hydrocarbons when used in a steam-reforming method for production of hydrogen in which hydrocarbons to be treated are mixed with steam. Further, the catalyst comprising the metallic cobalt fine particles having an average particle diameter of more than 20 nm tends to be considerably deteriorated in anti-coking property. The average particle diameter of the metallic cobalt fine particles is preferably not more than 10 nm and more preferably not more than 8 nm. The lower limit of the average particle diameter of the metallic cobalt fine particles is about 0.5 nm.

In the catalyst of the present invention which comprises magnesium, aluminum, nickel and cobalt as constitutional elements and further comprises ruthenium and/or palladium, the nickel, cobalt, ruthenium and palladium may be present in the form of an alloy thereof.

In the catalyst of the present invention which comprises magnesium, aluminum, nickel and cobalt as constitutional elements and further comprises ruthenium and/or palladium, the content of the metallic nickel is 0.1 to 20% by weight based on the weight of the catalyst. When the content of the metallic nickel is less than 0.1% by weight, the resulting catalyst tends to be lowered in conversion rate of hydrocarbons. On the other hand, when the content of the metallic nickel is more than 20% by weight, the particle size of the metal nickel fine particles tends to be more than 20 nm, so that the resulting catalyst tends to be considerably deteriorated in anti-coking property. The content of the metallic nickel in the catalyst is preferably 0.2 to 18% by weight.

In the catalyst of the present invention which comprises magnesium, aluminum, nickel and cobalt as constitutional elements and further comprises ruthenium and/or palladium, the content of the metallic cobalt is 0.01 to 20% by weight based on the weight of the catalyst. When the content of the metallic cobalt is less than 0.01% by weight, the resulting catalyst tends to be lowered in conversion rate of hydrocarbons. On the other hand, when the content of the metallic cobalt is more than 20% by weight, the particle size of the metal cobalt fine particles tends to be more than 20 nm, so that the resulting catalyst tends to be considerably deteriorated in anti-coking property. The content of the metallic cobalt in the catalyst is preferably 0.2 to 18% by weight.

In the catalyst of the present invention which comprises magnesium, aluminum, nickel and cobalt as constitutional elements and further comprises ruthenium and/or palladium, the weight ratio Co/Ni is preferably 0.01 to 50 and more preferably 0.1 to 20. When the weight ratio Co/Ni lies within the above-specified range, the resulting catalyst is excellent in anti-coking property.

In the catalyst of the present invention which comprises magnesium, aluminum, nickel and cobalt as constitutional elements and further comprises ruthenium and/or palladium, the weight ratio (Ru+Pd)/Ni is preferably 0.0025 to 50 and more preferably 0.001 to 25. When the weight ratio (Ru+Pd)/Ni lies within the above-specified range, the resulting catalyst is excellent in not only anti-coking property but also capability of decomposing hydrocarbons having 2 or more carbon atoms, in particular, hydrocarbons comprising propane.

In the catalyst of the present invention which comprises magnesium, aluminum, nickel and cobalt as constitutional elements and further comprises ruthenium and/or palladium, the metallic nickel, metallic cobalt, and metallic ruthenium and/or metallic palladium are preferably present in the vicinity of the surface of particles constituting the catalyst. Also, the catalyst of the present invention which comprises magnesium, aluminum, nickel and cobalt as constitutional elements and further comprises ruthenium and/or palladium is preferably used in the form of a molded product obtained by granulating the particles constituting the catalyst. The metallic nickel, metallic cobalt, and metallic ruthenium and/or metallic palladium may also be present in the vicinity of the surface of the molded product. Meanwhile, the term "in the vicinity of the surface of particles" as used herein means that the respective metal elements are present in a portion of the respective particles which extends from the surface over a region occupying 60% by volume. Also, the term "in the vicinity of the surface of the molded product" as used herein means that the respective metal elements are present in a portion of the molded product which extends from the surface over a region occupying 70% by volume. When allowing the metallic nickel, metallic cobalt, and metallic ruthenium and/or metallic palladium to be present in the vicinity of the surface of the respective particles or molded product, the resulting catalyst can exhibit such an effect that it is very excellent in anti-coking property and capability of decomposing hydrocarbons having 2 or more carbon atoms, in particular, hydrocarbons comprising propane.

In the catalyst of the present invention which comprises magnesium, aluminum, nickel and cobalt as constitutional elements and further comprises ruthenium and/or palladium, the proportion of magnesium and aluminum is not particularly limited. It is preferred that the content of magnesium be larger than the content of aluminum. The molar ratio of magnesium to aluminum (Mg:Al) in the catalyst is preferably 4:1 to 1.2:1. When the magnesium content is more than the above-specified range, it may be difficult to readily obtain a molded product having a sufficient strength. When the magnesium content is less than the above-specified range, it may be difficult to attain suitable properties as a porous carrier.

The catalyst of the present invention which comprises magnesium, aluminum, nickel and cobalt as constitutional elements and further comprises ruthenium and/or palladium preferably has a specific surface area of 5 to 320 $m^2/g$. When the specific surface area is less than 5 $m^2/g$, the resulting catalyst tends to be lowered in conversion rate of hydrocarbons at a high space velocity. When the specific surface area is more than 320 $m^2/g$, it may be difficult to industrially produce such a catalyst. The specific surface area of the catalyst is more preferably 10 to 250 $m^2/g$.

Next, the process for producing the catalyst which comprises magnesium, aluminum, nickel and cobalt as constitutional elements and further comprises ruthenium and/or palladium according to the present invention is described.

The process for producing the catalyst for decomposing hydrocarbons including hydrocarbons having 2 or more carbon atoms is not particularly limited as long as it is possible to produce a catalyst comprising magnesium, aluminum, nickel, cobalt and ruthenium and/or palladium. For example, there may be used the method of supporting nickel, cobalt and ruthenium and/or palladium on a carrier comprising magnesium and aluminum by an ordinary method such as a precipitation method, a heat impregnation method, a cold impregnation method, a vacuum impregnation method, an equilibrium adsorption method, an evaporation to dryness method, competitive adsorption method, an ion exchange method, a spray method and a coating method; and the method in which nickel and cobalt is incorporated into a spinel crystal structure compound comprising magnesium and aluminum to form a solid solution thereof, and then the solid solution is heat-treated to deposit metallic nickel and metallic cobalt on the spinel carrier comprising magnesium and aluminum. Among these methods, the method of producing the catalyst via the spinel crystal structure compound is preferred.

The catalyst of the present invention which comprises magnesium, aluminum, nickel and cobalt as constitutional elements and further comprises ruthenium and/or palladium may be produced by the method in which the respective constitutional elements are subjected to co-precipitation reaction to form layered double hydroxide (hydrotalcite) particles as a precursor, and then the resulting layered double hydroxide particles are baked with heating to form porous oxide particles, followed by subjecting the obtained porous oxide particles to heat reduction.

There is also known the method in which the layered double hydroxide particles are baked to obtain composite oxide particles, and then the composite oxide particles are hydrated with an aqueous solution comprising an anion to obtain layered double hydroxide particles. In the present invention, nickel, cobalt and ruthenium and/or palladium may be supported by the following production method. The layered double hydroxide particles on which nickel, cobalt and ruthenium and/or palladium are supported may be subjected to heat reduction, if required after being baked with heating.

More specifically, the supporting procedure may be carried out by the method in which the layered double hydroxide particles comprising only magnesium and aluminum is molded and baked to form a porous oxide molded product, and then the resulting molded product is impregnated with a solution comprising nickel, cobalt and ruthenium and/or palladium to thereby regenerate a layered double hydroxide particle phase comprising nickel, cobalt and ruthenium and/or palladium in the vicinity of the surface of the porous oxide particles or the molded product.

Alternatively, the supporting procedure may also be carried out by the method in which the layered double hydroxide particles on the surface of which nickel and cobalt are present are obtained by the above production method, molded and baked to form a porous oxide molded product, and then the resulting molded product is impregnated with a solution comprising ruthenium and/or palladium to thereby regenerate a layered double hydroxide particle phase comprising nickel and cobalt in the vicinity of the surface of the porous oxide particles or the molded product, or comprising ruthenium and/or palladium in the vicinity of the surface of the molded product.

In addition, the supporting procedure may also be carried out by the method in which the layered double hydroxide particles on the surface of which ruthenium and/or palladium are present are obtained by the above production method, molded and baked to form a porous oxide molded product, and then the resulting molded product is impregnated with a solution comprising nickel and cobalt to thereby regenerate a layered double hydroxide particle phase comprising ruthenium in the vicinity of the surface of the porous oxide particles or the molded product, or comprising nickel in the vicinity of the surface of the molded product.

Further, the supporting procedure may also be carried out by the method in which the layered double hydroxide particles on the surface of which nickel, cobalt and ruthenium and/or palladium are present are obtained by the above production method, molded and baked to obtain a porous oxide molded product, and then the resulting molded product is impregnated with a solution comprising nickel, cobalt and ruthenium and/or palladium to thereby regenerate a layered double hydroxide particle phase comprising nickel, cobalt and ruthenium and/or palladium in the vicinity of the surface of the porous oxide particles or the molded product, or comprising nickel, cobalt and ruthenium and/or palladium in the vicinity of the surface of the molded product.

The thus obtained catalyst in the form of particles may be molded according to the applications thereof. The size and shape of the catalyst are not particularly limited. For example, the catalyst may have a spherical shape, a cylindrical shape or a tubular shape, or may be applied onto a honeycomb-shaped body. In general, the catalyst having a spherical, cylindrical or tubular shape suitably has a size of about 0.1 to about 50 mm. Under certain some conditions, various binders such as organic materials and inorganic materials may be added to the catalyst to control a strength and a pore distribution of a molded product of the catalyst. Meanwhile, in the present invention, the catalyst may be granulated or molded before subjecting it to heat treatment.

In the present invention, the catalyst as defined in any one of the Inventions 1 to 3 may be previously mixed with alumina beads. When using the catalyst in combination with the alumina beads, the resulting catalyst mixture is capable of decomposing hydrocarbons (in particular, propane) in an efficient manner. The alumina beads used in combination with the catalyst may support thereon one or more active metal species selected from the group consisting of ruthenium, rhodium, indium, platinum, gold, silver, palladium, nickel, cobalt, copper, iron, zinc, vanadium and manganese. Among these active metal species, preferred is copper. The amount of the active metal species supported on the alumina beads is preferably 1 to 15% by weight based on the weight of the alumina beads.

The mixing ratio between the catalyst as defined in any one of the Inventions 1 to 3 and the alumina beads is preferably controlled such that a weight ratio of the alumina beads to the catalyst as defined in any one of the Inventions 1 to 3 is 1 to 50%.

A clay mineral may also be present in an amount of 1 to 50% in terms of a weight ratio based on the catalyst of the present invention. When the clay mineral coexists, the resulting catalyst is capable of decomposing hydrocarbons (in particular, propane) in a more efficient manner. When the amount of the clay mineral being present is less than 1%, the effect of addition thereof tends to be insufficient. When the amount of the clay mineral being present is more than 50%, the amount of the reforming catalyst per effective unit volume tends to be comparatively reduced. Therefore, in order to ensure the intended catalytic activity, it is required to reduce a flow rate of the gas to be treated, so that the use of a catalyst layer having a larger volume is needed. The amount of the clay mineral being present in the catalyst is preferably 2.5 to 45% and more preferably 5 to 40%.

Examples of the clay mineral incorporated in the catalyst include zeolite, sepiolite and montmorillonite. The structure of the zeolite is not particularly limited, and is preferably a faujasite. Among the faujasite-type zeolites, preferred are Y-type zeolites.

The clay mineral may be either incorporated in the catalyst or mixed in the form of a separate catalyst or a catalyst molded product in the catalyst layer. In addition, the catalyst molded product may be divided in separate parts and placed in the catalyst layer.

The shape and size of the clay mineral are not particularly limited. The clay mineral may have, for example, a cylindrical shape, a spherical shape, a tubular shape, etc., and a size of about 1 to about 5 mm.

In the case where the catalyst is used in the form of a separate honeycomb structure, any optional methods may be selectively employed according to the requirements.

The clay mineral used in the catalyst as defined in the Invention 4 may support thereon at least one active metal species selected from the group consisting of ruthenium, rhodium, indium, platinum, gold, silver, palladium, nickel, cobalt, copper, iron, zinc, vanadium and manganese which has an average particle diameter of not more than 50 nm (Invention 5). When the active metal species is supported on the clay mineral, the resulting catalyst is capable of decomposing hydrocarbons (in particular, propane) in a more efficient manner.

When the average particle diameter of the active metal species such as ruthenium, rhodium, indium, platinum, gold, silver, palladium, nickel, cobalt, copper, iron, zinc, vanadium and manganese is more than 50 nm, the effect of supporting the active metal species on the clay mineral tends to be unobtainable. The average particle diameter of the active metal species is preferably not more than 35 nm and more preferably not more than 20 nm.

The amount of the active metal species supported on the clay mineral may vary depending upon kind of active metal species to be supported or kind of clay mineral supporting the active metal species and, therefore, is not particularly limited. For example, the amount of the active metal species supported on the clay mineral may be in the range of 0.01 to 30% by weight based on the weight of the clay mineral.

Next, the process for producing a mixed gas comprising hydrogen from hydrocarbons according to the present invention is described.

The catalyst as defined in any one of the Inventions 1 to 5 is contacted with hydrocarbons to obtain a mixed reformed gas comprising hydrogen. In particular, the catalyst of the present invention exhibits an excellent capability of decomposing the hydrocarbons even when the hydrocarbons comprise hydrocarbons having 2 or more carbon atoms.

In the process for producing a mixed gas comprising hydrogen from hydrocarbons according to the present invention, a raw material gas comprising hydrocarbons having 2 or more carbon atoms such as propane and steam are contacted with the hydrocarbon-decomposing catalyst of the present invention under the conditions including a temperature of 250 to 850° C., a molar ratio of steam to carbon (S/C ratio) of 1.0 to 6.0 and a space velocity (GHSV) of 100 to 100000 $h_{-1}$, When the reaction temperature is less than 250° C., the conversion rate of lower hydrocarbons tends to be reduced, so that when the reaction is conducted for a long period of time, coking tends to be caused, finally resulting in deactivation of the catalyst. When the reaction temperature is more than 850° C., the active metal species tends to suffer from sintering, so that the catalyst tends to be deactivated. The reaction temperature is preferably 300 to 700° C. and more preferably 400 to 700° C.

When the molar ratio S/C of steam (5) to hydrocarbons (C) is less than 1.0, the anti-coking property tends to be deteriorated. When the molar ratio s/c of steam (5) to carbon (C) is more than 6.0, a large amount of steam tends to be required for the production of hydrogen, resulting in high production costs and unpractical process. The molar ratio S/C is preferably 1.5 to 6.0 and more preferably 1.8 to 5.0.

Meanwhile, the space velocity (GHSV) is preferably 100 to 100000 $h^{-1}$ and more preferably 1000 to 10000 $h^{-1}$.

The hydrocarbons used in the present invention are not particularly limited, and various hydrocarbons may be used therein. Examples of the hydrocarbons may include saturated aliphatic hydrocarbons such as methane, ethane, propane, butane, pentane, hexane and cyclohexane; unsaturated hydrocarbons such as ethylene, propylene and butene; aromatic hydrocarbons such as benzene, toluene and xylene; and mixtures of these compounds. Also, suitable examples of the industrially usable raw materials may include city gas 13A, natural gases, LPG, kerosene, gasoline, light oils and naphtha. Meanwhile, the hydrocarbons having 2 or more carbon atoms may comprise only one kind of hydrocarbon. In particular, the hydrocarbon-decomposing catalyst of the present invention exhibits an excellent decomposing performance even for those including the $C_2$ or more hydrocarbons.

When the hydrocarbons used in the present invention are those kept in a liquid state at room temperature such as kerosene, gasoline and light oils, such hydrocarbons may be vaporized by an evaporator upon use.

The catalyst of the present invention may also be applied to an autothermal steam-reforming method and a partial oxidation method.

When using the catalyst of the present invention under the condition of a temperature of not more than 150° C. which is generally considered to be a temperature at which nickel carbonyl is formed in a carbon monoxide-containing gas, the metal carbonyl can be removed from such a reaction field. In general, when the temperature exceeds 150° C., carbon monoxide is stabilized, so that formation of the metal carbonyl such as nickel carbonyl does not occur. The concentration of carbon monoxide is not particularly limited, and may be, for example, not more than 30% by volume. When it is required to intensively suppress formation of the metal carbonyl for the reason of high carbon monoxide concentration, the amount of copper or a clay mineral, or the amount of the clay mineral on which an active metal species is supported, may be increased relative to the amount of carbon monoxide.

The catalyst as defined in any one of the Inventions 1 to 5 may be used in a fuel cell system. The catalyst of the present invention may be disposed in a reforming reaction section or a pre-reforming reaction section of the fuel cell system and/or steps before and after the reforming reaction section, steps appended thereto, or outside of the reforming reaction section, and is preferably disposed in a reforming reaction section or a pre-reforming reaction section of the fuel cell system and/or steps before and after the reforming reaction section.

<Function>

The reason why the catalyst for decomposing hydrocarbons including hydrocarbons having 2 or more carbon atoms according to the present invention can exhibit excellent catalytic activity and anti-coking property, is considered by the present inventor as follows, although it is not clearly determined.

In the catalyst for decomposing hydrocarbons including hydrocarbons having 2 or more carbon atoms according to the present invention, the metallic nickel is supported thereon in the form of very finely divided particles. Therefore, the metallic nickel as an active metal species is increased in contact area with steam, so that the catalyst has an excellent catalytic activity. Further, since the metallic cobalt is also supported in the form of very finely divided particles, the catalyst is capable of decomposing the hydrocarbons having 2 or more carbon atoms in a more efficient manner and, therefore, can exhibit an enhanced catalytic activity.

In addition, since the metallic ruthenium and/or metallic palladium are allowed to be present in a very small amount, the decomposition of the hydrocarbons (in particular, propane) can be further promoted.

Also, the reason why the reforming catalyst of the present invention in which the clay mineral or the clay mineral supporting an active metal species is present exhibits an excellent anti-coking property, is considered by the present inventor as follows, although it is not clearly determined.

That is, it is considered by the present inventor that the metallic ruthenium fine particles and metallic palladium fine particles act for converting a majority of the $C_2$ or more hydrocarbons into those comprising a $C_1$ hydrocarbon as a main component, and then the metallic nickel fine particles and metallic cobalt fine particles act for reforming the hydrocarbons comprising the $C_1$ hydrocarbon as a main component, so that the catalyst is free from occurrence of coking and is excellent in capability of decomposing hydrocarbons (in particular, propane).

Further, it is considered by the present inventor that since the metallic nickel and metallic cobalt are allowed to be present individually or in an alloyed state, the catalyst is enhanced in anti-coking property even when using the $C_2$ or more hydrocarbons as a raw material.

EXAMPLES

Typical embodiments and examples of the present invention are as follows.

The size of the active metal species supported on the catalyst was measured using a transmission electron microscope ("JEM-1200EXII" manufactured by Nippon Denshi Co., Ltd.).

The BET specific surface area was measured by a nitrogen BET method.

The contents of Mg and active metal species were determined as follows. That is, a sample was dissolved in an acid, and the resulting solution was analyzed by a plasma emission spectroscopic device ("SPS-4000" manufactured by Seiko Denshi Kogyo Co., Ltd.).

The catalytic activity of the obtained catalyst was evaluated by using a single-tube fixed bed flowing type apparatus with a laboratory level (reaction tube volume: 100 cc). The evaluation and study in the present invention were carried out by using a self-assembled apparatus although an ordinary commercially available apparatus may be used therefor. The analysis of components after the reforming reaction was carried out by using a gas chromatograph.

Typical examples of the present invention are described below.

Example 1

Production of Catalyst

One thousand milliliters of a metal solution in which 173.1 g of $MgSO_4 \cdot 7H_2O$, 68.32 g of $Al_2(SO_4)_3 \cdot 8H_2O$, 40.63 g of $NiSO_4 \cdot 6H_2O$, 17.38 g of $CoSO_4 \cdot 7H_2O$ and 3.964 mL of a ruthenium chloride solution comprising 51 g/L of metallic ruthenium were dissolved, and 1000 mL of an alkali mixed solution in which 335.0 mL of NaOH solution (concentration: 14 mol/L) and 20.85 g of $Na_2CO_3$ were dissolved, were prepared. The alkali mixed solution was mixed with the above prepared mixed metal solution comprising the magnesium salt, aluminum salt, nickel salt, cobalt salt and ruthenium salt, and the resulting solution was aged at 95° C. for 8 hr to obtain a hydrous double hydroxide. The resulting hydrous double hydroxide was separated by filtration, and then dried to obtain dried particles.

The thus obtained hydrous double hydroxide particles were molded to form spherical beads having a diameter of 3 mm. The obtained spherical beads were calcined in air at 1150° C. for 8 hr to convert the hydroxide into an oxide, and then the thus calcined spherical beads were subjected to reducing treatment at 820° C. for 3 hr in a gas flow comprising hydrogen and argon at a volume ratio of 20/80, thereby obtaining a catalyst for decomposing hydrocarbons including hydrocarbons having 2 or more carbon atoms.

It was confirmed that the nickel content in the resulting catalyst was 16.33% by weight, and the metallic nickel fine particles had a particle size of 5 nm; the cobalt content in the resulting catalyst was 6.557% by weight, and the metallic cobalt fine particles had a particle size of 2 nm; and the Ru content in the resulting catalyst was 0.364% by weight, and the Ru had a size of 1 nm.

<Reaction Using the Catalyst for Decomposing Hydrocarbons Including Hydrocarbons Having 2 or More Carbon Atoms>

The performance of the obtained catalyst for decomposing hydrocarbons including hydrocarbons having 2 or more carbon atoms was evaluated as follows. That is, 10 to 50 g of the catalyst was filled in a stainless steel reaction tube having a diameter of 20 mm to prepare a catalyst-filled tube.

A raw material gas and steam were passed through the catalyst-filled tube (reactor) under the conditions including a reaction pressure of 0.1 MPa, a reaction temperature of 300 to 800° C. and a space velocity of 10000 h$^{-1}$. At this time, the ratio of steam to carbon was 1.0, and the ratio of steam to carbon was 3.0. Meanwhile, the reaction was conducted using a city gas (13A) and propane as the raw material gas comprising hydrocarbons.

Since $C_2$ or more hydrocarbons were decomposed into methane, CO, $CO_2$ and $H_2$, the catalyst performance was evaluated using a conversion rate of the raw material gas (conversion rate of the raw material gas used for evaluation of the catalyst performance) and a conversion rate of $C_n$ (conversion rate of whole hydrocarbons) represented by the following formulae. Also, when using the city gas (13A) as the raw material gas, a conversion rate of the $C_2$ or more hydrocarbons (such as ethane, propane, butane and pentane) contained in the raw material gas was calculated and regarded as a conversion rate of the city gas (13A).

Example) In the case where propane was used as the raw material gas:

Conversion Rate of Propane=100×(CO+$CO_2$+$CH_4$+$C_2H_6$)/(CO+$CO_2$+$CH_4$+$C_2H_6$+$C_3H_8$)

Conversion Rate of $C_n$ (Conversion Rate of Whole Hydrocarbons)=(CO+$CO_2$)/(CO+$CO_2$+$CH_4$+$C_2H_6$+$C_3H_8$)

The catalyst performance of the catalysts for decomposing hydrocarbons including hydrocarbons having 2 or more carbon atoms are shown in Tables 1 to 3.

In Table 1, there is shown the relationship between the reaction temperature (300 to 700° C.) and conversion rate of Cn when the reaction was conducted using a city gas (13A) as the raw material gas under the conditions including a space velocity (GHSV) of 3000 h' and 50000 h1, a ratio of steam to carbon (SIC) of 3.0 and a reaction time of 24 hr.

In Table 2, there is shown the relationship between the reaction temperature (300 to 700° C.), the conversion rate of propane, the conversion rate of $C_n$ and the concentration of unreacted propane in the reformed gas (dried gas after reaction) when the reaction was conducted using propane as the raw material gas under the conditions including a space velocity (GHSV) of 3000 h$^{-1}$, a ratio of steam to carbon (S/C) of 3.0 and a reaction time of 24 hr.

In Table 3, there is shown the relationship between the reaction time, the conversion rate of propane and the amounts of carbon deposited before and after measurement of the catalytic activity, when the reaction was conducted using propane as the raw material gas under the conditions including a space velocity (GHSV) of 3000 h$^{-1}$, a reaction temperature of 400° C. and a ratio of steam to carbon (S/C) of 1.0 and 3.0.

Example 2

One thousand milliliters of a metal solution in which 310.5 g of $MgSO_4.7H_2O$, 145.9 g of $Al_2(SO_4)_3.8H_2O$, 15.77 g of $NiSO_4.6H_2O$, 92.76 g of $CoSO_4.7H_2O$ and 97.52 mL of a palladium nitrate solution comprising 50 g/L of metallic Pd were dissolved, and 1500 mL of an alkali mixed solution in which 721.0 mL of NaOH solution (concentration: 14 mol/L) and 44.52 g of $Na_2CO_3$ were dissolved, were prepared. The alkali mixed solution was mixed with the above prepared mixed metal solution comprising the magnesium salt, aluminum salt, nickel salt, cobalt salt and palladium salt, and the resulting solution was aged at 95° C. for 8 hr to obtain a hydrous double hydroxide. The resulting hydrous double hydroxide was separated by filtration, and then dried to obtain dried particles.

The thus obtained hydrous double hydroxide particles were molded to form spherical beads having a diameter of 3 mm. The obtained spherical beads were calcined in air at 1100° C. for 12 hr to convert the hydroxide into an oxide, and then the thus calcined spherical beads were subjected to reducing treatment at 810° C. for 3 hr in a gas flow comprising hydrogen and argon at a volume ratio of 10/90, thereby obtaining a catalyst for decomposing hydrocarbons including hydrocarbons having 2 or more carbon atoms.

It was confirmed that the nickel content in the resulting catalyst was 3.224% by weight, and the metallic nickel fine particles had a particle size of 1 nm; the cobalt content in the resulting catalyst was 17.81% by weight, and the metallic cobalt fine particles had a particle size of 9 nm; and the Pd content in the resulting catalyst was 4.674% by weight, and the Pd had a size of 8 nm.

Example 3

One thousand and five hundred milliliters of a metal solution in which 126.7 g of $MgSO_4.7H_2O$, 41.67 g of $Al_2(SO_4)_3.8H_2O$, 36.05 g of $NiSO_4.6H_2O$, 21.69 g of $CoSO_4.7H_2O$, 0.991 mL of a ruthenium chloride solution comprising 51 g/L of metallic Ru, and 0.424 mL of a palladium chloride solution comprising 50 g/L of metallic Pd were dissolved, and 1500 mL of an alkali mixed solution in which 569.0 mL of NaOH solution (concentration: 14 mol/L) and 12.72 g of $Na_2CO_3$ were dissolved, were prepared. The alkali mixed solution was mixed with the above prepared mixed metal solution comprising the magnesium salt, aluminum salt, nickel salt, cobalt salt, ruthenium salt and palladium salt, and the resulting solution was aged at 80° C. for 6 hr to obtain a hydrous double hydroxide. The resulting hydrous double hydroxide was separated by filtration, and then dried to obtain dried particles.

The thus obtained hydrous double hydroxide particles were molded to form spherical beads having a diameter of 3 mm. The obtained spherical beads were calcined in air at 1000° C. for 18 hr to convert the hydroxide into an oxide, and then the thus calcined spherical beads were subjected to reducing treatment at 800° C. for 1 hr in a gas flow comprising hydrogen and argon at a volume ratio of 10/90, thereby obtaining a catalyst for decomposing hydrocarbons including hydrocarbons having 2 or more carbon atoms.

It was confirmed that the nickel content in the resulting catalyst was 19.10% by weight, and the metallic nickel fine particles had a particle size of 15 nm; the cobalt content in the resulting catalyst was 10.79% by weight, and the metallic cobalt fine particles had a particle size of 6 nm; the Ru content in the resulting catalyst was 0.120% by weight, and the Ru had a size of 3 nm; and the Pd content in the resulting catalyst was 0.050% by weight, and the Pd had a size of 2 nm.

Example 4

Five hundred milliliters of a metal solution in which 98.44 g of $MgSO_4.7H_2O$, 35.97 g of $Al_2(SO_4)_3.8H_2O$, 13.16 g of $NiSO_4.6H_2O$ and 0.208 g of $CoSO_4.7H_2O$ were dissolved, and 1000 mL of an alkali mixed solution in which 204.0 mL of NaOH solution (concentration: 14 mol/L) and 10.98 g of $Na_2CO_3$ were dissolved, were prepared. The alkali mixed solution was mixed with the above prepared mixed metal solution comprising the magnesium salt, aluminum salt, nickel salt and cobalt salt, and the resulting solution was aged at 95° C. for 4 hr to obtain a hydrous double hydroxide. The resulting hydrous double hydroxide was separated by filtration, and then dried to obtain dried particles.

The thus obtained hydrous double hydroxide particles were molded to form spherical beads having a diameter of 3 mm. The obtained spherical beads were calcined in air at 1100° C. for 22 hr to convert the hydroxide into an oxide. Thereafter, 10 mL of a coating solution prepared by diluting 5.945 mL of a ruthenium nitrate solution comprising 51 g/L of metallic Ru with pure water was spray-coated onto the spherical beads, and then the spherical beads were subjected to reducing treatment at 800° C. for 1 hr in a gas flow comprising hydrogen and argon at a volume ratio of 5/95, thereby obtaining a catalyst for decomposing hydrocarbons including hydrocarbons having 2 or more carbon atoms.

It was confirmed that the nickel content in the resulting catalyst was 11.24% by weight, and the metallic nickel fine particles had a particle size of 4 nm; the cobalt content in the resulting catalyst was 0.161% by weight, and the metallic cobalt fine particles had a particle size of 1 nm; and the Ru content in the resulting catalyst was 1.122% by weight, and the Ru had a size of 4 nm.

Example 5

Seven hundred milliliters of a metal solution in which 213.9 g of $MgSO_4.7H_2O$ and 84.45 g of $Al_2(SO_4)_3.8H_2O$ were dissolved, and 1500 mL of an alkali mixed solution in which 534.0 mL of NaOH solution (concentration: 14 mol/L) and 25.78 g of $Na_2CO_3$ were dissolved, were prepared. The alkali mixed solution was mixed with the above prepared mixed metal solution comprising the magnesium salt and aluminum salt, and the resulting solution was aged at 95° C. for 10 hr to obtain a hydrous double hydroxide. The resulting hydrous double hydroxide was separated by filtration, and then dried to obtain dried particles.

The thus obtained hydrous double hydroxide particles were molded to form spherical beads having a diameter of 3 mm. The obtained spherical beads were calcined in air at 1200° C. for 15 hr, thereby obtaining spherical beads comprising oxides of magnesium and aluminum and having a diameter of 3 mm.

Thereafter, 30 mL of a coating solution prepared by diluting a mixture of 10.32 g of $Ni(NO_3)_2.6H_2O$, 19.53 g of $Co(NO_3)_2.6H_2O$ and 5.945 mL of a ruthenium nitrate solution comprising 51 g/L of metallic Ru with pure water was intermittently spray-coated in several divided parts onto the spherical beads, and then the spherical beads were subjected to reducing treatment at 800° C. for 2 hr in a gas flow comprising hydrogen and argon at a volume ratio of 30/70, thereby obtaining a catalyst for decomposing hydrocarbons including hydrocarbons having 2 or more carbon atoms.

It was confirmed that the nickel content in the resulting catalyst was 3.295% by weight, and the metallic nickel fine particles had a particle size of 2 nm; the cobalt content in the resulting catalyst was 6.616% by weight, and the metallic cobalt fine particles had a particle size of 4 nm; and the Ru content in the resulting catalyst was 4.988% by weight, and the Ru had a size of 9 nm.

Example 6

One thousand milliliters of a metal solution in which 264.0 g of $MgSO_4.7H_2O$ and 104.2 g of $Al_2(SO_4)_3.8H_2O$ were dissolved, and 2000 mL in total of an alkali mixed solution obtained by adding 1000 mL of a solution in which 38.43 g of $Na_2CO_3$ were dissolved, to 341.0 mL of NaOH solution (concentration: 14 mol/L), were prepared. The alkali mixed solution was mixed with the above prepared mixed metal solution comprising the magnesium salt and aluminum salt, and the resulting solution was aged at 110° C. for 5 hr to obtain hydrous double hydroxide core particles.

Next, the thus obtained alkali suspension was mixed with 500 mL of a mixed solution comprising a magnesium salt, a nickel salt, a cobalt salt, an aluminum salt and a ruthenium salt in which 55.00 g of $MgSO_4.7H_2O$, 42.24 g of $NiSO_4.6H_2O$, 7.529 g of $CoSO_4.7H_2O$, 21.71 g of $Al_2(SO_4)_3.8H_2O$ and 59.45 mL of a ruthenium nitrate solution comprising 51 g/L of metallic Ru were dissolved, and the resulting mixture was further aged at 120° C. for 6 hr to thereby allow topotactic growth of these metal components on the surface of the hydrous double hydroxide particles. The thus obtained hydrous double hydroxide particles were separated by filtration, and then dried to obtain dried particles.

The thus obtained hydrous double hydroxide particles were molded to form spherical beads having a diameter of 3 mm. The obtained spherical beads were calcined in air at 1050° C. for 8 hr to convert the hydroxide into an oxide. Thereafter, the spherical beads were subjected to reducing treatment at 820° C. for 6 hr in a gas flow comprising hydrogen and argon at a volume ratio of 22/78, thereby obtaining a catalyst for decomposing hydrocarbons including hydrocarbons having 2 or more carbon atoms.

It was confirmed that the nickel content in the resulting catalyst was 9.432% by weight, and the metallic nickel fine particles had a particle size of 7 nm; the cobalt content in the resulting catalyst was 1.704% by weight, and the metallic cobalt fine particles had a particle size of 2 nm; and the Ru content in the resulting catalyst was 3.273% by weight, and the Ru had a size of 6 nm.

Example 7

Alpha(α)-alumina particles were formed into 3 mmφ spherical beads, and the obtained spherical beads were calcined in air at 1250° C. for 10 hr. The thus formed α-alumina spherical beads were sprayed several times with total 200 mL of a coating solution prepared by dissolving 13.57 g of $Mg(NO_3)_2.6H_2O$, 16.18 g of $Ni(NO_3)_2.6H_2O$, 16.31 g of $Co(NO_3)_2.6H_2O$ and 50.28 mL of a ruthenium nitrate solution comprising 51 g/L of metallic Ru in pure water. The obtained beads were dried and then calcined in air at 580° C.

for 6 hr. Thereafter, the spherical beads were subjected to reducing treatment at 550° C. for 3 hr in a gas flow comprising hydrogen and argon at a volume ratio of 10/90, thereby obtaining a catalyst for decomposing hydrocarbons including hydrocarbons having 2 or more carbon atoms.

It was confirmed that the nickel content in the resulting catalyst was 3.265% by weight, and the metallic nickel fine particles had a particle size of 9 nm; the cobalt content in the resulting catalyst was 1.1% by weight, and the metallic cobalt fine particles had a particle size of 3 nm; and the Ru content in the resulting catalyst was 2.514% by weight, and the Ru had a size of 5 nm.

Example 8

Using spherical beads having a diameter of 3 mm which were produced in the same manner as defined in Example 5, Ru was spray-supported thereon in an amount of 2.159% by weight in terms of metallic Ru, and the thus sprayed spherical beads were dried and then heat-treated at 250° C. for 3 hr. Thereafter, the spherical beads were subjected to reducing treatment at 500° C. for 1 hr in a gas flow comprising hydrogen and argon at a volume ratio of 10/90, thereby obtaining a catalyst. The metallic Ru fine particles in the thus obtained catalyst had a particle size of 6 nm.

The obtained Ru-supporting spherical beads were mixed with the catalyst beads of Example 3 such that the former beads were present in an amount of 50% by weight based on the latter beads, thereby obtaining a catalyst for decomposing hydrocarbons including hydrocarbons having 2 or more carbon atoms.

It was confirmed that the nickel content in the obtained whole catalyst was 9.551% by weight, the cobalt content therein was 5.395% by weight, the Ru content therein was 1.139% by weight, and the Pd content therein was 0.025% by weight.

Example 9

Alpha($\alpha$)-alumina particles were formed into 3 mm$\phi$ spherical beads, and the obtained spherical beads were calcined in air at 1300° C. for 16 hr. Pd was spray-supported on the resulting $\alpha$-alumina spherical beads in an amount of 1.162% by weight in terms of metallic Pd, and the obtained beads were dried and then calcined in air at 320° C. for 4 hr. Thereafter, the spherical beads were subjected to reducing treatment at 500° C. for 2 hr in a gas flow comprising hydrogen and argon at a volume ratio of 40/60, thereby obtaining a hydrogen-decomposing catalyst. The metallic Pd fine particles in the resulting catalyst had a particle diameter of 8 nm.

The thus obtained Pd-supporting spherical beads were mixed with the catalyst beads of Example 3 such that the former beads were present in an amount of 20% by weight based on the latter beads, thereby obtaining a catalyst for decomposing hydrocarbons including hydrocarbons having 2 or more carbon atoms.

It was confirmed that the nickel content in the obtained whole catalyst was 15.28% by weight, the cobalt content therein was 8.631% by weight, the Ru content therein was 0.096% by weight, and the Pd content therein was 0.272% by weight.

Example 10

Co in an amount of 2.562% by weight in terms of metallic Co was spray-supported on a Y-type zeolite molded product having a diameter of 1 mm and a height of 2 to 3 mm, and the obtained Co-supporting molded product was dried and then calcined in air at 600° C. for 3 hr. Thereafter, the molded product was subjected to reducing treatment at 700° C. for 4 hr in a gas flow comprising hydrogen and argon at a volume ratio of 30/70, thereby obtaining a catalyst for decomposing hydrocarbons including hydrocarbons having 2 or more carbon atoms. The metallic Co fine particles in the resulting catalyst had a particle diameter of 9 nm.

The thus obtained Co-supporting Y-type zeolite molded product was mixed with the catalyst beads of Example 3 such that the former molded product was present in an amount of 30% by weight based on the latter beads, thereby obtaining a catalyst for decomposing hydrocarbons including hydrocarbons having 2 or more carbon atoms.

It was confirmed that the nickel content in the obtained whole catalyst was 13.37% by weight, the cobalt content therein was 8.321% by weight, the Ru content therein was 0.084% by weight, and the Pd content therein was 0.035% by weight.

Comparative Example 1

Alpha($\alpha$)-alumina particles were formed into 3 mm$\phi$ spherical beads, and the obtained spherical beads were calcined in air at 1150° C. for 18 hr. The thus formed $\alpha$-alumina spherical beads were spray-coated several times with total 200 mL of a coating solution prepared by dissolving 65.73 g of $Ni(NO_2.6H_2O$ in pure water, dried, and then calcined in air at 660° C. for 6 hr. Thereafter, the spherical beads were subjected to reducing treatment at 500° C. for 2 hr in a gas flow comprising hydrogen and argon at a volume ratio of 40/60, thereby obtaining a catalyst. It was confirmed that the nickel content in the resulting catalyst was 13.27% by weight, and the metallic nickel fine particles had a particle size of 61 nm.

Comparative Example 2

One thousand milliliters of a metal solution in which 207.4 g of $MgSO_4.7H_2O$, 63.95 g of $Al(SO_4)_3.8H_2O$ and 103.7 g of $NiSO_4.6H_2O$ were dissolved, and 1500 mL of an alkali mixed solution in which 233.0 mL of NaOH solution (concentration: 14 mol/L) and 19.52 g of $Na_2CO_3$ were dissolved, were prepared. The alkali mixed solution was mixed with the above prepared mixed metal solution comprising the magnesium salt, aluminum salt and nickel salt, and the resulting mixture was aged at 60° C. for 12 hr to obtain a hydrous double hydroxide.

The thus obtained hydrous double hydroxide particles were molded to form spherical beads having a diameter of 3 mm. The obtained spherical beads were calcined in air at 1300° C. for 15 hr to convert the hydroxide into an oxide. Thereafter, the spherical beads were subjected to reducing treatment at 810° C. for 2 hr in a gas flow comprising hydrogen and argon at a volume ratio of 50/50, thereby obtaining a hydrocarbon-decomposing catalyst.

It was confirmed that the nickel content in the resulting catalyst was 32.85% by weight, and the metallic nickel fine particles had a particle size of 41 nm.

Comparative Example 3

One thousand milliliters of a metal solution in which 189.0 g of $MgSO_4.7H_2O$, 74.59 g of $Al_2(SO_4)_3.8H_2O$, 77.62 g of $CoSO_4.7H_2O$ and 99.09 mL of a ruthenium nitrate solution comprising 51 g/L of metallic Ru were dissolved, and 500 mL of an alkali mixed solution in which 368.0 mL of NaOH solution (concentration: 14 mol/L) and 22.76 g of Na₂CO₃ were dissolved, were prepared. The alkali mixed solution was mixed with the above prepared mixed metal solution comprising the magnesium salt, aluminum salt, cobalt salt and ruthenium salt, and the resulting mixture was aged at 90° C. for 12 hr to obtain a hydrous double hydroxide. The resulting hydrous double hydroxide was separated by filtration, and then dried to obtain dried particles.

The thus obtained hydrous double hydroxide particles were molded to form spherical beads having a diameter of 3 mm. The obtained spherical beads were calcined in air at 1100° C. for 9 hr to convert the hydroxide into an oxide. Thereafter, the spherical beads were subjected to reducing treatment at 795° C. for 3 hr in a gas flow comprising hydrogen and argon at a volume ratio of 10/90, thereby obtaining a hydrocarbon-decomposing catalyst.

It was confirmed that the cobalt content in the resulting catalyst was 23.97% by weight, and the metallic cobalt fine particles had a particle size of 34 nm; and the Ru content in the resulting catalyst was 7.444% by weight, and the Ru had a size of 25 nm.

Comparative Example 4

Eight hundred milliliters of a metal solution in which 40.5 g of MgSO₄.7H₂O, 15.99 g of Al₂(SO₄)₃.8H₂O, 34.57 g of NiSO₄.6H₂O and 33.27 g of CoSO₄.7H₂O were dissolved, and 400 mL of an alkali mixed solution in which 216.0 mL of NaOH solution (concentration: 14 mol/L) and 4.879 g of Na₂CO₃ were dissolved, were prepared. The alkali mixed solution was mixed with the above prepared mixed metal solution comprising the magnesium salt, aluminum salt, nickel salt and cobalt salt, and the resulting mixture was aged at 70° C. for 4 hr to obtain a hydrous double hydroxide. The resulting hydrous double hydroxide was separated by filtration, and then dried to obtain dried particles.

The thus obtained hydrous double hydroxide particles were molded to form spherical beads having a diameter of 3 mm. The obtained spherical beads were calcined in air at 1200° C. for 4 hr to convert the hydroxide into an oxide. Thereafter, the spherical beads were subjected to reducing treatment at 800° C. for 1.5 hr in a gas flow comprising hydrogen and argon at a volume ratio of 15/85, thereby obtaining a hydrocarbon-decomposing catalyst.

It was confirmed that the nickel content in the resulting catalyst was 31.28% by weight, and the metallic nickel fine particles had a particle size of 44 nm; and the cobalt content in the resulting catalyst was 28.27% by weight, and the metallic cobalt fine particles had a particle size of 52 nm.

Comparative Example 5

Seven hundred milliliters of a metal solution in which 36.96 g of MgSO₄.7H₂100, 14.59 g of Al₂(SO₄)₃.8H₂O, 23.66 g of NiSO₄.6H₂O and 99.09 mL of a ruthenium nitrate solution comprising 51 g/L of metallic Ru were dissolved, and 300 mL of an alkali mixed solution in which 201.0 mL of NaOH solution (concentration: 14 mol/L) and 4.452 g of Na₂CO₃ were dissolved, were prepared. The alkali mixed solution was mixed with the above prepared mixed metal solution comprising the magnesium salt, aluminum salt, nickel salt and ruthenium salt, and the resulting mixture was aged at 78° C. for 22 hr to obtain a hydrous double hydroxide. The resulting hydrous double hydroxide was separated by filtration, and then dried to obtain dried particles.

The thus obtained hydrous double hydroxide particles were molded to form spherical beads having a diameter of 3 mm. The obtained spherical beads were calcined in air at 900° C. for 18 hr to convert the hydroxide into an oxide. Thereafter, the spherical beads were subjected to reducing treatment at 825° C. for 3 hr in a gas flow comprising hydrogen and argon at a volume ratio of 50/50, thereby obtaining a hydrocarbon-decomposing catalyst.

It was confirmed that the nickel content in the resulting catalyst was 27.17% by weight, and the metallic nickel fine particles had a particle size of 34 nm; and the Ru content in the resulting catalyst was 25.99% by weight, and the Ru had a size of 62 nm.

The catalyst performances of the respective obtained catalysts are shown in Tables 1 to 3, and compositions of these catalysts are shown in Table 4.

TABLE 1

| | Reaction temperature (° C.) | GHSV = 3000 h⁻¹ Cn conversion rate (%) | GHSV = 50000 h⁻¹ Cn conversion rate (%) |
|---|---|---|---|
| Examples | | | |
| Example 1 | 300 | 10.04 | 10.03 |
| | 400 | 22.69 | 22.71 |
| | 500 | 45.97 | 45.98 |
| | 600 | 78.23 | 78.22 |
| | 700 | 97.29 | 97.3 |
| Example 2 | 300 | 10.05 | 10.04 |
| | 400 | 22.7 | 22.68 |
| | 500 | 45.96 | 45.98 |
| | 600 | 78.21 | 78.19 |
| | 700 | 97.3 | 97.28 |
| Example 3 | 300 | 10.03 | 10.04 |
| | 400 | 22.68 | 22.67 |
| | 500 | 45.95 | 45.94 |
| | 600 | 78.22 | 78.21 |
| | 700 | 97.29 | 97.3 |
| Example 4 | 300 | 10.04 | 10.02 |
| | 400 | 22.69 | 22.71 |
| | 500 | 45.96 | 45.95 |
| | 600 | 78.22 | 78.19 |
| | 700 | 97.28 | 97.24 |
| Example 5 | 300 | 10.05 | 10.03 |
| | 400 | 22.69 | 22.66 |
| | 500 | 45.98 | 45.94 |
| | 600 | 78.23 | 78.2 |
| | 700 | 97.3 | 97.28 |
| Example 6 | 300 | 10.05 | 10.03 |
| | 400 | 22.69 | 22.7 |
| | 500 | 45.97 | 45.95 |
| | 600 | 78.22 | 78.18 |
| | 700 | 97.29 | 97.22 |
| Example 7 | 300 | 10.03 | 10.02 |
| | 400 | 22.68 | 22.71 |
| | 500 | 45.96 | 45.96 |
| | 600 | 78.21 | 78.19 |
| | 700 | 97.29 | 97.25 |
| Example 8 | 300 | 10.03 | 10.01 |
| | 400 | 22.68 | 22.69 |
| | 500 | 45.97 | 45.94 |
| | 600 | 78.22 | 78.19 |
| | 700 | 97.29 | 97.28 |
| Example 9 | 300 | 10.05 | 10.03 |
| | 400 | 22.69 | 22.68 |
| | 500 | 45.97 | 45.95 |
| | 600 | 78.23 | 78.21 |
| | 700 | 97.29 | 97.3 |
| Example 10 | 300 | 10.05 | 10.04 |
| | 400 | 22.71 | 22.69 |
| | 500 | 45.98 | 45.92 |
| | 600 | 78.23 | 78.18 |
| | 700 | 97.29 | 97.26 |

TABLE 1-continued

| | Reaction temperature (° C.) | GHSV = 3000 h$^{-1}$ Cn conversion rate (%) | GHSV = 50000 h$^{-1}$ Cn conversion rate (%) |
|---|---|---|---|
| Comparative Examples | | | |
| Comparative Example 1 | 300 | 6.55 | 4.56 |
| | 400 | 13.21 | 10.25 |
| | 500 | 28.56 | 24.36 |
| | 600 | 61.24 | 52.36 |
| | 700 | 79.55 | 71.85 |
| Comparative Example 2 | 300 | 7.14 | 5.89 |
| | 400 | 15.24 | 13.46 |
| | 500 | 31.26 | 25.63 |
| | 600 | 65.21 | 59.36 |
| | 700 | 84.21 | 78.25 |
| Comparative Example 3 | 300 | 7.32 | 6.02 |
| | 400 | 15.54 | 13.65 |
| | 500 | 31.41 | 25.74 |
| | 600 | 65.52 | 59.76 |
| | 700 | 84.36 | 78.49 |
| Comparative Example 4 | 300 | 7.11 | 5.72 |
| | 400 | 15.12 | 13.32 |
| | 500 | 30.98 | 25.49 |
| | 600 | 65.08 | 59.19 |
| | 700 | 84.09 | 78.06 |
| Comparative Example 5 | 300 | 7.45 | 6.22 |
| | 400 | 15.68 | 13.72 |
| | 500 | 31.54 | 25.92 |
| | 600 | 65.92 | 60.12 |
| | 700 | 84.76 | 78.62 |

TABLE 2

| | | GHSV = 3000 h$^{-1}$ | | |
|---|---|---|---|---|
| | Reaction temperature (° C.) | Propane conversion rate (%) | Cn conversion rate (%) | Unreacted propane (vol %) |
| Examples | | | | |
| Example 1 | 300 | 100 | 20.98 | 0 |
| | 400 | 100 | 31.96 | 0 |
| | 500 | 100 | 53.07 | 0 |
| | 600 | 100 | 82.19 | 0 |
| | 700 | 100 | 97.99 | 0 |
| Example 2 | 300 | 100 | 21.01 | 0 |
| | 400 | 100 | 31.97 | 0 |
| | 500 | 100 | 53.08 | 0 |
| | 600 | 100 | 82.21 | 0 |
| | 700 | 100 | 98 | 0 |
| Example 3 | 300 | 100 | 21.02 | 0 |
| | 400 | 100 | 31.97 | 0 |
| | 500 | 100 | 53.09 | 0 |
| | 600 | 100 | 82.22 | 0 |
| | 700 | 100 | 98 | 0 |
| Example 4 | 300 | 100 | 20.98 | 0 |
| | 400 | 100 | 31.96 | 0 |
| | 500 | 100 | 53.06 | 0 |
| | 600 | 100 | 82.18 | 0 |
| | 700 | 100 | 97.99 | 0 |
| Example 5 | 300 | 100 | 21.01 | 0 |
| | 400 | 100 | 31.96 | 0 |
| | 500 | 100 | 53.08 | 0 |
| | 600 | 100 | 82.2 | 0 |
| | 700 | 100 | 97.98 | 0 |
| Example 6 | 300 | 100 | 21.01 | 0 |
| | 400 | 100 | 31.96 | 0 |
| | 500 | 100 | 53.06 | 0 |
| | 600 | 100 | 82.18 | 0 |
| | 700 | 100 | 97.98 | 0 |
| Example 7 | 300 | 99.8 | 21.95 | 0.11 |
| | 400 | 100 | 31.97 | 0 |
| | 500 | 100 | 53.07 | 0 |
| | 600 | 100 | 82.2 | 0 |
| | 700 | 100 | 97.98 | 0 |
| Example 8 | 300 | 100 | 21.01 | 0 |
| | 400 | 100 | 31.96 | 0 |
| | 500 | 100 | 53.09 | 0 |
| | 600 | 100 | 82.22 | 0 |
| | 700 | 100 | 98 | 0 |
| Example 9 | 300 | 100 | 21.02 | 0 |
| | 400 | 100 | 31.95 | 0 |
| | 500 | 100 | 53.07 | 0 |
| | 600 | 100 | 82.19 | 0 |
| | 700 | 100 | 97.96 | 0 |
| Example 10 | 300 | 100 | 21 | 0 |
| | 400 | 100 | 31.95 | 0 |
| | 500 | 100 | 53.08 | 0 |
| | 600 | 100 | 82.21 | 0 |
| | 700 | 100 | 97.99 | 0 |
| Comparative Examples | | | | |
| Comparative Example 1 | 300 | 32.62 | 18.24 | 32.65 |
| | 400 | 55.92 | 30.25 | 23.98 |
| | 500 | 87.12 | 48.62 | 5.89 |
| | 600 | 93.25 | 70.15 | 2.27 |
| | 700 | 98.51 | 92.15 | 0.55 |
| Comparative Example 2 | 300 | 41.25 | 21.04 | 27.25 |
| | 400 | 68.11 | 33.8 | 16.87 |
| | 500 | 94.77 | 49.3 | 2.34 |
| | 600 | 96.96 | 77.62 | 0.92 |
| | 700 | 100 | 92 | 0 |
| Comparative Example 3 | 300 | 42.25 | 21.14 | 26.85 |
| | 400 | 69.13 | 33.92 | 16.62 |
| | 500 | 95.01 | 49.41 | 2.16 |
| | 600 | 97.02 | 77.68 | 0.65 |
| | 700 | 100 | 93.25 | 0 |
| Comparative Example 4 | 300 | 33.72 | 18.52 | 31.68 |
| | 400 | 56.82 | 30.46 | 22.85 |
| | 500 | 87.82 | 49.12 | 4.75 |
| | 600 | 94.02 | 70.35 | 2.16 |
| | 700 | 98.62 | 92.51 | 0.38 |
| Comparative Example 5 | 300 | 43.12 | 21.32 | 25.74 |
| | 400 | 69.85 | 34.05 | 16.15 |
| | 500 | 95.32 | 49.52 | 1.99 |
| | 600 | 97.15 | 77.72 | 0.54 |
| | 700 | 100 | 93.41 | 0 |

TABLE 3

| | | S/C = 1.0 | | S/C = 3.0 | |
|---|---|---|---|---|---|
| | Reaction time (h) | Propane conversion rate (%) | Amount of carbon deposited (wt %) | Propane conversion rate (%) | Amount of carbon deposited (wt %) |
| Examples | | | | | |
| Example 1 | 12 | 100 | 0.05 | 99.8 | 0.04 |
| | 100 | 99.9 | 0.07 | 100 | 0.06 |
| | 200 | 100 | 0.11 | 100 | 0.08 |
| Example 2 | 12 | 100 | 0.06 | 99.7 | 0.03 |
| | 100 | 100 | 0.08 | 99.9 | 0.07 |
| | 200 | 100 | 0.12 | 100 | 0.11 |
| Example 3 | 12 | 99.8 | 0.04 | 100 | 0.03 |
| | 100 | 99.7 | 0.06 | 100 | 0.05 |
| | 200 | 100 | 0.08 | 100 | 0.07 |
| Example 4 | 12 | 100 | 0.06 | 99.9 | 0.06 |
| | 100 | 99.5 | 0.08 | 99.9 | 0.09 |
| | 200 | 99.8 | 0.12 | 99.9 | 0.13 |

TABLE 3-continued

| | | S/C = 1.0 | | S/C = 3.0 | |
|---|---|---|---|---|---|
| | Reaction time (h) | Propane conversion rate (%) | Amount of carbon deposited (wt %) | Propane conversion rate (%) | Amount of carbon deposited (wt %) |
| Example 5 | 12 | 100 | 0.05 | 99.7 | 0.04 |
| | 100 | 99.9 | 0.08 | 99.8 | 0.06 |
| | 200 | 99.8 | 0.13 | 100 | 0.11 |
| Example 6 | 12 | 99.5 | 0.06 | 99.6 | 0.05 |
| | 100 | 99.7 | 0.08 | 99.8 | 0.07 |
| | 200 | 100 | 0.11 | 100 | 0.12 |
| Example 7 | 12 | 99.9 | 0.08 | 99.7 | 0.04 |
| | 100 | 99.8 | 0.11 | 99.8 | 0.08 |
| | 200 | 100 | 0.13 | 100 | 0.1 |
| Example 8 | 12 | 99.9 | 0.04 | 99.6 | 0.03 |
| | 100 | 100 | 0.08 | 99.8 | 0.05 |
| | 200 | 99.6 | 0.13 | 100 | 0.09 |
| Example 9 | 12 | 99.8 | 0.06 | 99.5 | 0.02 |
| | 100 | 100 | 0.09 | 99.8 | 0.06 |
| | 200 | 99.7 | 0.14 | 99.9 | 0.09 |
| Example 10 | 12 | 99.6 | 0.05 | 100 | 0.04 |
| | 100 | 99.8 | 0.09 | 100 | 0.08 |
| | 200 | 100 | 0.14 | 99.8 | 0.12 |
| Comparative Examples | | | | | |
| Comparative Example 1 | 12 | 45.2 | 7.92 | 56 | 4.15 |
| | 100 | 34.2 | 10.52 | 46.5 | 7.62 |
| | 200 | 18.5 | 16.25 | 32.2 | 10.52 |
| Comparative Example 2 | 12 | 62.1 | 5.84 | 68 | 4.26 |
| | 100 | 51.4 | 8.21 | 52.13 | 7.12 |
| | 200 | 39.5 | 13.25 | 39.98 | 9.85 |
| Comparative Example 3 | 12 | 64.5 | 5.52 | 69.2 | 4.06 |
| | 100 | 55.6 | 7.84 | 53.24 | 6.82 |
| | 200 | 42.3 | 12.15 | 42.13 | 9.65 |
| Comparative Example 4 | 12 | 48.2 | 7.02 | 57.21 | 4.05 |
| | 100 | 36.5 | 11.14 | 47.5 | 7.41 |
| | 200 | 19.5 | 16.72 | 33.2 | 10.18 |
| Comparative Example 5 | 12 | 66.8 | 5.32 | 71.53 | 3.84 |
| | 100 | 57.4 | 7.52 | 55.52 | 6.65 |
| | 200 | 44.6 | 11.74 | 44.62 | 8.95 |

TABLE 4

| Examples and Comparative Examples | Ni content (wt %) | Co content (wt %) | Ru content (wt %) | Pd content (wt %) |
|---|---|---|---|---|
| Example 1 | 16.33 | 6.557 | 0.364 | — |
| Example 2 | 3.224 | 17.81 | — | 4.674 |
| Example 3 | 19.10 | 10.79 | 0.120 | 0.050 |
| Example 4 | 11.24 | 0.161 | 1.122 | — |
| Example 5 | 3.295 | 6.616 | 4.988 | — |
| Example 6 | 9.432 | 1.704 | 3.273 | — |
| Example 7 | 3.265 | 1.100 | 2.514 | — |
| Example 8 | 9.551 | 5.395 | 1.139 | 0.025 |
| Example 9 | 15.28 | 8.631 | 0.096 | 0.272 |
| Example 10 | 13.37 | 8.321 | 0.084 | 0.035 |
| Comparative Example 1 | 13.27 | — | — | — |
| Comparative Example 2 | 32.85 | — | — | — |
| Comparative Example 3 | — | 23.97 | 7.444 | — |
| Comparative Example 4 | 31.28 | 28.27 | — | — |
| Comparative Example 5 | 27.17 | — | 25.99 | — |

INDUSTRIAL APPLICABILITY

The hydrocarbon-decomposing catalyst of the present invention is not only capable of decomposing hydrocarbons (in particular, propane), but also is less expensive and exhibits an excellent catalytic activity as its function as well as an excellent anti-coking property. Therefore, in future, it is highly expected that much need for the above catalyst is caused in various applications such as fuel cell systems.

In the foregoing, although the present invention is explained in detail by Examples, the numeral ranges as defined in the present invention are necessarily intended to involve all of the ranges using the numerals described in any optional one of the above Examples as a critical value unless departing from the scope of the present invention, and it should be construed that all of them are described in the present specification.

The invention claimed is:

1. A catalyst for decomposing hydrocarbons including hydrocarbons having 2 or more carbon atoms, comprising magnesium oxide, aluminum oxide, metallic nickel and metallic cobalt as constitutional elements, and further comprising metallic ruthenium and/or metallic palladium and a clay mineral, wherein
    the metallic ruthenium and/or metallic palladium in the form of fine particles having an average particle diameter of 0.5 to 20 nm,
    a content of the metallic ruthenium and/or metallic palladium being 0.05 to 5.0% by weight based on the weight of the catalyst, and
    the clay mineral is present in an amount of 1 to 50% by weight based on the weight of the catalyst.

2. A catalyst for decomposing hydrocarbons including hydrocarbons having 2 or more carbon atoms according to claim 1, wherein the metallic nickel in the form of fine particles have an average particle diameter of 1 to 20 nm, and a content of the metallic nickel is 0.1 to 20% by weight based on the weight of the hydrocarbon-decomposing catalyst.

3. A catalyst for decomposing hydrocarbons including hydrocarbons having 2 or more carbon atoms according to claim 1, wherein the metallic cobalt in the form of fine particles have an average particle diameter of 1 to 20 nm, and a content of the metallic cobalt is 0.01 to 20% by weight based on the weight of the hydrocarbon-decomposing catalyst.

4. A catalyst for decomposing hydrocarbons including hydrocarbons having 2 or more carbon atoms according to claim 1, wherein at least one element selected from the group consisting of ruthenium, rhodium, iridium, platinum, gold, silver, palladium, nickel, cobalt, copper, iron, zinc, vanadium and manganese, which has an average particle diameter of not more than 50 nm, is supported on the clay mineral.

5. A process for producing a mixed reformed gas comprising hydrogen from hydrocarbons, comprising a step of reacting the hydrocarbons including hydrocarbons having 2 or more carbon atoms with steam at a temperature of 250 to 850° C., at a molar ratio of steam to carbon (S/C) of 1.0 to 6.0 and at a space velocity (GHSV) of 100 to 100000 $h^{-1}$ in the presence of the hydrocarbon-decomposing catalyst as defined in claim 1.

* * * * *